United States Patent [19]
Aalto

[11] Patent Number: 5,886,817
[45] Date of Patent: Mar. 23, 1999

[54] METHOD AND ARRANGEMENT FOR CREATING A THREE-DIMENSIONAL EFFECT

[75] Inventor: Lasse Aalto, Turku, Finland

[73] Assignee: Juhani Suvitie, Turku, Finland

[21] Appl. No.: 871,866

[22] Filed: Jun. 9, 1997

Related U.S. Application Data

[63] Continuation of Ser. No. 491,172, Jun. 19, 1995, which is a continuation-in-part of PCT/FI93/00264 abandoned.

[30] Foreign Application Priority Data

Jun. 17, 1992 [FI] Finland ..................................... 922838

[51] Int. Cl.$^6$ ............................. G02B 27/24; G02B 27/22
[52] U.S. Cl. ......................... 359/472; 359/466; 359/462; 359/471
[58] Field of Search ..................................... 359/462, 466, 359/467, 470, 471, 472, 473, 476

[56] References Cited

U.S. PATENT DOCUMENTS

| | | | |
|---|---|---|---|
| 2,359,703 | 10/1944 | Wood | 359/472 |
| 2,837,967 | 6/1958 | Grey | 359/472 |
| 2,889,739 | 6/1959 | Moore | 359/471 |
| 3,891,303 | 6/1975 | Barquero | 359/466 |
| 4,925,270 | 5/1990 | Eckmann | 359/473 |
| 5,119,234 | 6/1992 | Van Der Walt | 359/472 |

FOREIGN PATENT DOCUMENTS 0505602  5/1939  United Kingdom ................... 359/472

Primary Examiner—Cassandra Spyrou
Assistant Examiner—Audrey Chang
Attorney, Agent, or Firm—Kubovcik & Kubovcik

[57] ABSTRACT

A method and an arrangement for creating a three-dimensional effect, in which method the three-dimensional effect is created by viewing an object, for instance two disparate images, by way of an optical aid. To provide a simple implementation, the first image is viewed with one eye in a normal manner without impediment and the second image is viewed simultaneously with the other eye by way of a separate optical aid freely displaceable between the eye and the second image.

4 Claims, 2 Drawing Sheets

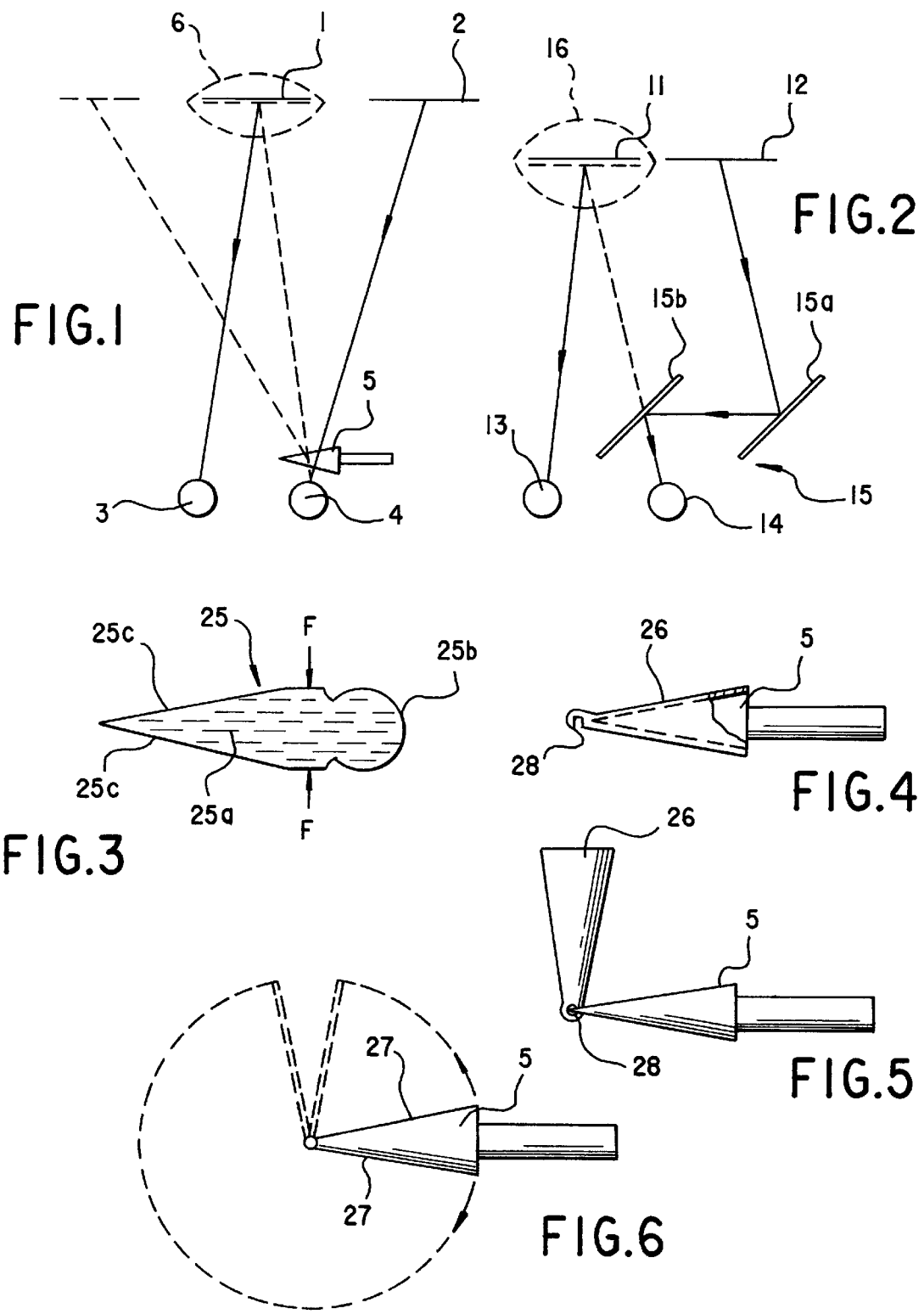

METHOD AND ARRANGEMENT FOR CREATING A THREE-DIMENSIONAL EFFECT

This application is a continuation of application Ser. No. 08/491,172, filed Jun. 19, 1995, now abandoned, which is a continuation of international application PCT/FI93/00264, now abandoned.

BACKGROUND OF THE INVENTION

1. Field of the Invention

The invention relates to a method for creating a three-dimensional effect, in which method the three-dimensional effect is created by viewing an object, for instance two disparate images, by means of an optical aid. The invention relates further to an arrangement for creating a three-dimensional effect.

2. Description of the Prior Art

Three-dimensional effect can be utilized when viewing for instance photographs, diapositives, textbooks, nature books, installation manuals, computer displays, product brochures, advertisements, etc.

Previously known stereoscopic viewing devices are similar to a binocle or spectacles, i.e. devices intended for a viewer's both eyes. The devices may be unsuitable for the viewer's sight, and therefore, they are often provided with adjusting means to adapt them to the viewer's sight. However, adjusting means are often very unhandy and suitable for use within certain limits only. Blinders of many kinds have also often been used in previously known devices for limiting the viewing area. The blinders are to be adjusted according to the distance between the eyes as well as according to image size and viewing distance. When the image size changes, a readjustment is necessary, which makes the viewing uncomfortable. In addition, the known devices are intended for viewing images in the horizontal plane; it is difficult to adjust them for viewing images deviating from the horizontal plane. The previous viewing devices are inconvenient in use and their manufacturing costs are high, and therefore, they have been used very little. Viewing by means of the previous devices can be called "tube viewing", which is a very limited way of viewing, meaning that only a limited area is seen.

As examples of said previously known technique may be set forth in this connection the solutions disclosed in U.S. Pat. Nos. 4,429,951, 4,717,239, 4,730,898 and 4,986,632. Drawbacks of these solutions are the very facts mentioned above, which have prevented them from coming into common use.

As additional examples of known solutions in the field may be mentioned the solutions disclosed in U.S. Pat. No. 5,119,234, European Patent Application 0 204 867 and German Offenlegungsschrift 3 305 444. However, all these solutions function on the same principle as spectacles, which means that optical aids are arranged fixedly before the viewer's eyes, because of which the viewer has to move closer to and farther off the image and the sharpness disappears. A further problem is that these devices are more difficult to use if the viewer wears spectacles.

SUMMARY OF THE INVENTION

The object of the invention is to provide a method and an arrangement, by means of which the drawbacks of the prior art may be eliminated. This has been achieved by means of the method of the invention, which is characterized in that the first image is viewed with one eye in a normal manner without impediment and that the second image is viewed simultaneously with the other eye by means of a separate optical aid freely displaceable between the eye and the second image. The arrangement according to the invention is in turn characterized in that the optical aid is an instrument to be arranged only before one eye, freely displaceable between the eye and the image and not influencing the other eye, which instrument is arranged to guide information from the second image to the eye before which the aid is positioned.

A primary advantage of the invention is that a three-dimensional effect is created in a very simple manner. The viewer can keep his normal usual field of vision almost entirely and view the object quite normally irrespective of his power of seeing, which means that the viewer may wear spectacles when viewing the object if he wears such normally etc. The invention does not necessarily require blinders of any kind, because a human being has an ability to choose from the information existing in the visual field the object he desires to view. This ability is a very dominant property one does not often even think of. A further advantage of the arrangement according to the invention is that the arrangement can be made very small and light, which means that it may be a portable device, a table device etc. Still an advantage of the invention is that images deviating from the horizontal plane can also be viewed.

BRIEF DESCRIPTION OF THE DRAWINGS

In the following, the invention will be explained in greater detail by means of preferred embodiments shown in the attached drawings, whereby FIG. 1 shows a general view of the operating principle of a first embodiment of the invention from above, FIG. 2 shows a general view of the operating principle of a second embodiment of the invention from above, FIG. 3 shows a general view of a preferred embodiment of an arrangement according to the invention from the side, FIGS. 4 and 5 show an embodiment of the arrangement according to the invention provided with a housing, FIG. 6 shows an embodiment of the arrangement according to the invention provided with another kind of housing.

DESCRIPTION OF THE PREFERRED EMBODIMENTS

Figure 7:
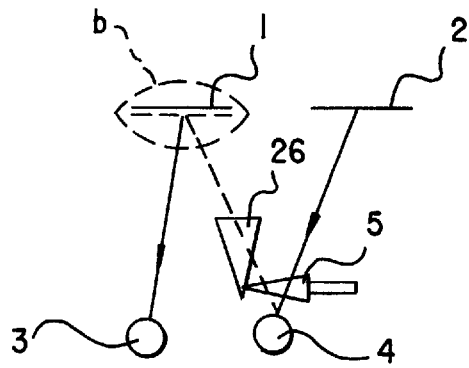
FIG. 7 shows a general view of the operating principle of the embodiments according to FIGS. 4 to 6 from above.
Figure 8:
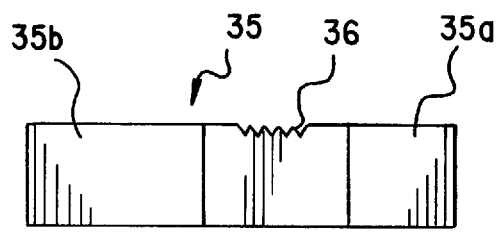
FIGS. 8 and 9 show general views of a double-sided embodiment of the arrangement according to the invention seen in different directions and FIGS. 10 and 11 show the embodiment according to the FIGS. 8 and 9 provided with a protective casing.
Figure 9:
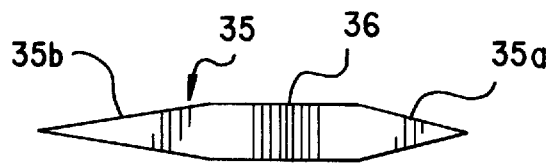
Figure 10:
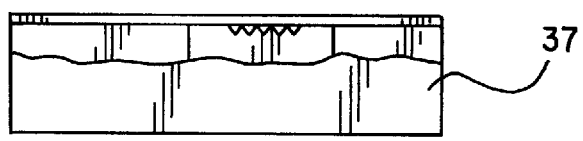
Figure 11:
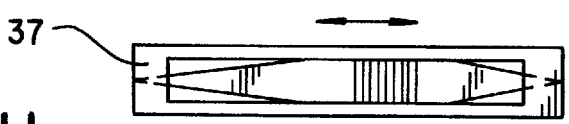

The figures show some preferred embodiments of the invention. FIG. 1 shows by means of reference numerals 1 and 2 a pair of images, from which a three-dimensional effect is created. Reference numerals 3 and 4 of FIG. 1 indicate a viewer's eyes in principle. Reference numeral 5 again indicates an optical aid, by means of which the three-dimensional effect is treated. Reference numeral 6 indicates a three-dimensional virtual image, which is produced by means of the pair of images 1, 2 and the aid 5. A solid line with arrows illustrates how information goes from the image 1 to the eye 3 and from the image 2 to the eye .4, respectively. The virtual image 6 and the production thereof are indicated generally by broken lines.

Accordingly, the object to be viewed consists of two slightly different images or figures of the same object. To create a three-dimensional effect, the optical aid, i.e. a viewing device, is placed before one eye so as to guide information from that image of the image pair that faces this eye to this eye. The other eye gets the information without impediment from the second image. A third image, a three-dimensional effect, is thus created. This third image, which has depth, is not a real one, but a virtual image created by the brain from two real images. The viewing device may be removed from before the eye when the images are sufficiently close to each other and have a suitable size, whereby the three-dimensional effect remains. Some training is needed, however, to make the three-dimensional effect last.

According to the substantial idea of the invention, the first image 1 is viewed with one eye 3 in a normal way without impediment and the second image 2 is viewed simultaneously with the other eye 4 by means of an optical aid 5 freely displaceable between the eye and the second image. It is essential that the optical aid 5 is an instrument to be arranged only before one eye 4 and not influencing the other eye, which instrument is arranged to guide information from the second image 2 to the eye 4 before which the aid 5 is positioned.

Accordingly, the object to be viewed, for instance two disparate images, are viewed in the invention in a substantially normal way; there is a viewing device, i.e. an optical aid 5, only between the second image 2 and the other eye 4, which aid may be a prism, for instance. The eye 3 receives an image of the first image 1 without impediment, which creates a three-dimensional effect 6. According to the invention, the viewing takes place in natural surroundings. In addition, it is possible to remove the viewing device from between the image 2 and the eye 4 when viewing images of a certain size, and the three-dimensional effect lasts, as has been described above.

It is to be noted that by displacing the optical aid between the eye and the image and/or by changing its position, the image visible through the aid can be moved closer to or farther off the second image. The fact is that the images have to be sufficiently superimposed on each other to provide a three-dimensional effect and to make the viewing comfortable. One substantial advantage of the invention is disclosed here; it is not necessary to change the distance for accurate viewing, but the image seen is sharp. When using previously known devices fixed to the spectacles, one must move closer to or farther off the image, which makes the sharpness disappear.

FIG. 2 shows another embodiment of the invention Reference numerals 11 and 12 indicate a pair of disparate images and reference numerals 13 and 14 the viewer's eyes. Reference numeral 15 indicates an optical aid, in this embodiment consisting of mirror means 15a and 15b. Reference numeral 16 indicates a three-dimensional virtual image produced by means of the images 11 and 12 as well as the optical means 15. The course of information from the images to the eyes and the production of the virtual image, respectively, are presented in the same way as in FIG. 1. The embodiment of FIG. 2 differs from the embodiment of FIG. 1 only therein that the embodiment of FIG. 2 utilizes mirror means instead of the prism of the embodiment of FIG. 1.

FIG. 3 presents one possibility of implementing the optical aid. In the embodiment of FIG. 3, the optical aid 25 comprises an optical part 25a, the angle of which guiding the information may be changed according to the viewing distance. The aid comprises an elastic receptacle part 25b. Surfaces 25c are made of transparent plastic or glass, for instance. The surfaces 25c and the receptacle part 25b form an enclosed space filled with transparent liquid. The angle guiding the information may be adjusted by squeezing e.g. with fingers according to arrows F, as a consequence of which a part of the liquid moves into the elastic receptacle part and said angle changes in the desired way.

Previously has often been presented that a three-dimensional effect is created easier by using blinders for making two-dimensional images, such as images 1 and 2, invisible. This may be partly true, but for many viewers it is just the opposite; when the viewer sees two-dimensional images adjacent to a three-dimensional image, he learns very quickly to see the depth of the image, i.e. the three-dimensional effect. When viewing three-dimensional information of different sizes or at different distances, the position of the viewing device has to be changed. When a viewing device is used and the image pairs are far from each other, four images are seen. One important advantage of unlimited viewing appears here: the position of the viewing device is changed in such a way that the center images are superimposed, which creates a three-dimensional effect, and only three images are seen. The center image is three-dimensional and its effect is strong enough to create almost the whole observation, which means that almost nothing else is seen, except by forcing the eyes to look at something else. Unlimited viewing does not create any anguish in sensitive persons, which is the case in connection with tube viewing. Additionally, the luminous intensity remains higher, because the viewing device is placed before one eye only. The viewing device may be removed from before the eye in certain circumstances. Because of the small size of the viewing device intended for conventional viewing, it can be taken along easily, which makes viewing of three-dimensional information independent on place. The size, low manufacturing costs and easy use of the viewing device make it possible to begin using three-dimensional material almost everywhere, and so can three-dimensional effect finally be brought into everyday life. The unhandiness and complicatedness of the present viewing devices have up until now prevented an introduction of tridimensionality into everyday life.

Accordingly, it is essential for the arrangement according to the invention that the information of the second image 2, for instance, can be easily guided to the eye 4 by this arrangement, while the other eye 3 receives its information without impediment from the first image 1, the image pairs being positioned in the horizontal plane or in a plane deviating from the horizontal plane. The image pairs may be close to or far from each other and the size of the image pairs may vary. The optical aid may be, e.g., a prism, a lens, a semi-lens, a lens with planar surface or a viewing device having a surface or surfaces deviating from the planar surface, by means of which it is possible to provide the virtual image produced, e.g., by means of the optical aid with a larger, breadth. The optical aid may also be a device similar to a periscope with a mirror or prism structure or a combination of prism and lens, by means of which the second original image can be magnified or reduced for saving space, for instance. The optical aid, i.e. the viewing device, can also be a Fresnel lens or a Fresnel prism structure. For guiding information can also be used an optical fiber provided with a certain lens and/or prism structure. It is also possible to use a viewing device the angle of which may be changed as per viewing distance, as stated above. The material of the viewing device may be, e.g., transparent plastic, such as acrylic plastic, or glass.

A mirror viewing device similar to a periscope presented in FIG. 2 may consist of two mirrors, for instance. It is naturally also possible to use several, e.g., four mirrors. When a mirror device is used, the images may be close to or very far from each other.

By means of a lens or prism device, it is not possible to reach anywhere near the range of variation of the distance between images effected by means of a mirror device without changing the prism angle, for instance, which means that a prism of another kind shall be taken into use, which may be arranged in the same viewing device, however. A further advantage of a mirror viewing device is that no colored streaks appear at the edges of a three-dimensional image, such streaks turn up when a lens and prism device is used. In addition, the mirror device has a better image contrast. On the basis of the above facts, a three-dimensional image is provided, which has a considerably good quality.

FIGS. 4 and 5 show a version of the embodiment of the invention provided with a housing 26. In the embodiment of the FIGS. 4 and 5, the housing is detachable and may be arranged in two positions shown in the FIGS. 4 and 5. In the position of FIG. 4, the housing 26 protects the optical aid 5, which is a prism in this embodiment. In the position of FIG. 5, the housing 26 prevents the information of both images 1 and 2 from reaching one eye. This fact appears clearly from FIG. 7 presenting the embodiment provided with the housing in a viewing situation. The reference numerals of FIG. 7 correspond substantially to the reference numerals of FIG. 1. The housing 26 may be fastened to the position according to FIG. 5 by means of a mounting slot 28.

FIG. 6 shows a version provided with a housing 27 of another kind. In this embodiment the housing consists of two cover parts turnable from the position protecting the optical aid to the position shown by broken lines in FIG. 6, in which position the housing 27 prevents an access of information from both images to the other eye, as shown in FIG. 7.

As shown in FIG. 7, the housing prevents the left eye 3 from seeing the right image 2 and the right eye from seeing the left image 1. The right eye 4 sees a refracted image of the right image 2, which creates a three-dimensional effect together with the left image 1. The three-dimensional image is a virtual image.

FIGS. 8 to 11 show a double-sided embodiment of the arrangement according to the invention. The optical aid is generally indicated by reference numeral 35. In this embodiment the optical aid comprises two prisms 35a, 35b, having different angles. The prism provided with the sharper angle may be used when viewing the image pair at a close distance. The other prism is used when viewing the image pair at a normal distance. Reference numeral 36 indicates a roughening for seizing and reference numeral 37 a protective casing. The direction of motion of the device is marked on FIG. 11 by means of an arrow. The embodiment of the FIGS. 8 to 11 suits especially well for shortsighted people.

The embodiments presented above are not intended to restrict the invention in any way, but the invention may be modified within the scope of the claims quite freely. It is thus clear that the embodiment of the invention or its details do not necessarily need to agree exactly with the figures, but solutions of other kinds are also possible. The shape, size and method of use may vary. The surface of the viewing device may naturally be treated in connection with the manufacture in such a way that reflections disappear and the surface becomes more durable etc.

I claim:

1. A method for creating a three-dimensional effect of an object by viewing two stereoscopically related images, said method comprising the steps of:

viewing a first image with one eye in a normal manner without impediment; and simultaneously viewing a second image with the other eye by means of a separate optical aid freely displaceable between said other eye and said second image to the extent that the images are sufficiently superimposed on each other to provide said three-dimensional effect, said optical aid comprising two prisms, each prism having refracting surfaces and wherein an angle between the refracting surfaces of the first prism is different from an angle between the refracting surfaces of the second prism.

2. An arrangement for creating a three-dimensional effect of an object by viewing two stereoscopically related images by viewing a first image with one eye in a normal manner without impediment; and by simultaneously viewing a second image with the other eye by means of a separate optical aid, said arrangement comprising:

an optical aid for observing an image of said object, said optical aid being arranged before only one eye so that the other eye is not influenced by said optical aid, and said optical aid being freely displaceable between said other eye and said second image to the extent that the images are sufficiently superimposed on each other to provide said three-dimensional effect, said optical aid comprising two prisms, each prism having refracting surfaces and wherein an angle between the refracting surfaces of the first prism is different from an angle between the refracting surfaces of the second prism.

3. A method for creating a three-dimensional effect of an object by viewing two stereoscopically related images, said method comprising the steps of:

viewing a first image with one eye in a normal manner without impediment; and simultaneously viewing a second image with the other eye by means of a separate optical aid freely displaceable between said other eye and said second image to the extent that the images are sufficiently superimposed on each other to provide said three-dimensional effect, said optical aid comprising two prisms, each prism having reflecting surfaces and wherein an angle between the reflecting surfaces of the first prism is different from an angle between the reflecting surfaces of the second prism.

4. An arrangement for creating a three-dimensional effect of an object by viewing two stereoscopically related images by viewing a first image with one eye in a normal manner without impediment; and by simultaneously viewing a second image with the other eye by means of a separate optical aid, said arrangement comprising:

an optical aid for observing an image of said object, said optical aid being arranged before only one eye so that the other eye is not influenced by said optical aid, and said optical aid being freely displaceable between said other eye and said second image to the extent that the images are sufficiently superimposed on each other to provide said three-dimensional effect, said optical aid comprising two prisms, each prism having reflecting surfaces and wherein an angle between the reflecting surfaces of the first prism is different from an angle between the reflecting surfaces of the second prism.

* * * * *